United States Patent [19]

Muranaka et al.

[11] Patent Number: 5,500,292
[45] Date of Patent: Mar. 19, 1996

[54] POLYMER ELECTROLYTE HYDROGEN-OXYGEN FUEL CELL WHERE THE POLYMER ELECTROLYTE HAS A WATER REPELLENCY GRADIENT AND A CATALYTICALLY ACTIVE COMPONENT CONCENTRATION GRADIEM ACROSS OXYGEN ELECTRODE

[75] Inventors: Yasushi Muranaka, Katsuta; Jinichi Imahashi; Tatsuo Horiba, both of Hitachi; Shigeoki Nishimura, Katsuta, all of Japan

[73] Assignee: Hitachi, Ltd., Tokyo, Japan

[21] Appl. No.: 272,618

[22] Filed: Jul. 11, 1994

Related U.S. Application Data

[63] Continuation of Ser. No. 28,222, Mar. 9, 1993, abandoned.

[30] Foreign Application Priority Data

Mar. 9, 1992 [JP] Japan ................................ 4-050365

[51] Int. Cl.$^6$ ............................ H01M 4/02; H01M 4/90
[52] U.S. Cl. ............................ 429/209; 429/41; 429/42; 429/33; 429/192; 429/218; 180/65.1; 180/65.3; 310/300; 318/558
[58] Field of Search ............................ 429/30, 41, 42, 429/33, 192, 209, 218; 204/252, 291; 180/65.1, 65.3; 310/300; 318/558

[56] References Cited

U.S. PATENT DOCUMENTS

| | | | |
|---|---|---|---|
| 4,175,165 | 11/1979 | Adlhart | 429/30 |
| 4,444,852 | 4/1984 | Liu et al. | 429/42 |
| 4,543,303 | 9/1985 | Dantowitz et al. | 429/34 |
| 4,804,592 | 2/1989 | Vanderborgh et al. | 429/33 |
| 4,876,115 | 10/1989 | Raistrick | 427/115 |
| 4,931,168 | 6/1990 | Watanabe et al. | 204/283 |

FOREIGN PATENT DOCUMENTS

| | | |
|---|---|---|
| 2398392 | 2/1979 | France . |
| 3323491 | 1/1984 | Germany . |
| 55-113272 | 9/1980 | Japan . |
| 58-204188 | 11/1983 | Japan . |
| 60-035472 | 2/1985 | Japan . |
| 1-143151 | 6/1989 | Japan . |
| 2086071 | 3/1990 | Japan . |
| 2-260371 | 10/1990 | Japan . |
| 3-102774 | 4/1991 | Japan . |

OTHER PUBLICATIONS

"Hyomen", vol. 26, No. 12; pp. 904–909; 1988 No month available considered only for brief explanation in the specification.

"Denkikagaku", vol. 53, No. 10; pp. 812–817; 1985 No month available considered for Eng. Ab.

Energy, The International Journal, vol. 11, No. 1/2, 1986, pp. 137–152, Appleby, et al, (SPEFCs) No month available.

*Primary Examiner*—Kathryn Gorgos
*Attorney, Agent, or Firm*—Antonelli, Terry, Stout & Kraus

[57] ABSTRACT

The polymer electrolyte type hydrogen-oxygen fuel cell of the present invention comprises an oxygen electrode and a hydrogen electrode, a polymer electrolyte membrane provided between the oxygen electrode and hydrogen electrode and electron conductors provided on the side of the electrodes which is opposite to the electrolyte side and the oxygen electrode comprises a catalytically active component, a carrier for the catalytically active component and a binder and has such a gradient in water repellency across the thickness that the water repellency is highest in the area adjacent to the electrolyte and lowest in the area adjacent to the conductor. In this fuel cell, flooding of water at the interface between the oxygen electrode and the electrolyte can be prevented.

10 Claims, 5 Drawing Sheets

FIG. 5
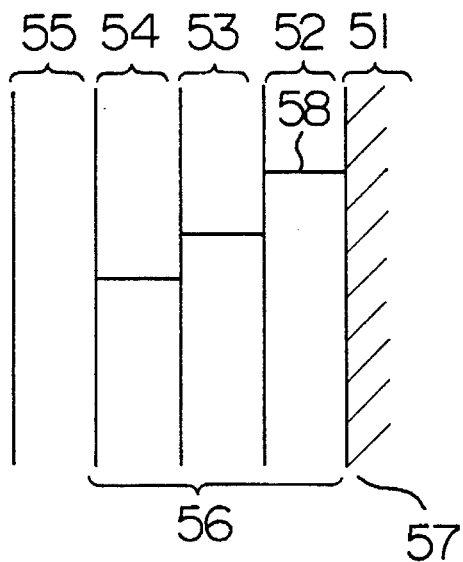
FIG. 6(1)
FIG. 6(2)
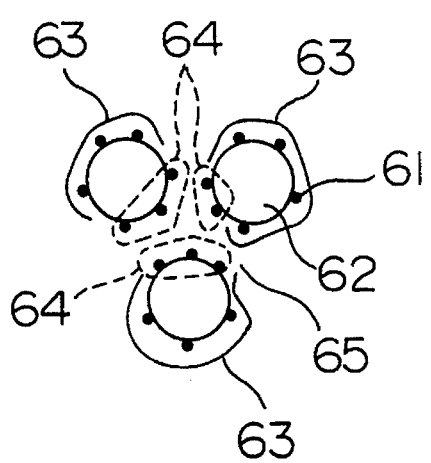
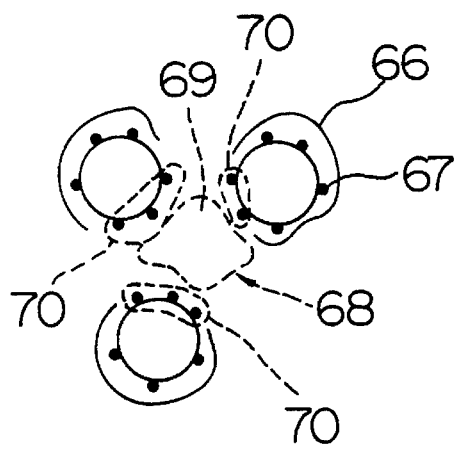

POLYMER ELECTROLYTE HYDROGEN-OXYGEN FUEL CELL WHERE THE POLYMER ELECTROLYTE HAS A WATER REPELLENCY GRADIENT AND A CATALYTICALLY ACTIVE COMPONENT CONCENTRATION GRADIEM ACROSS OXYGEN ELECTRODE

This application is a continuation application of Ser. No. 08/028,222 filed on Mar. 9, 1993 now abandoned.

BACKGROUND OF THE INVENTION

1. Field of the Invention

The present invention relates to fuel cells and in particular to polymer electrolyte type hydrogen-oxygen fuel cells containing a polymer electrolyte.

2. Description of Related Art

Fuel cells containing a polymer electrolyte generally have the construction which comprises an integral an ion-exchange membrane as an ionic conductor and an oxygen electrode and a hydrogen electrode provided respectively on both the sides of the ion-exchange membrane as disclosed in "HYOMEN ( Surface )", Vol. 26, No. 12 (1988), pp. 904–909.

Furthermore, as mentioned in "DENKIKAGAKU (Electroche-mistry)", Vol. 53, No. 10 (1985), pp. 812–817, the two electrodes may comprise a platinum catalyst, carbon as a carrier for the catalyst and polytetrafluoroethylene (hereinafter referred to as "PTFE" as a binder and the same material as of the ion-exchange membrane.

The reactions in the fuel cells are mainly as follows:

(1) Diffusion of hydrogen and oxygen onto the surface of the catalyst.

(2) Reaction on the surface of the catalyst (in both the hydrogen electrode and the oxygen electrode).

(3) Conduction of protons (in the hydrogen electrode and in the ion-exchange membrane).

The diffusion or reaction rate in respective processes has a great influence on the cell output. To use a corrugated current collector for efficient diffusion of hydrogen and oxygen onto the surface of the catalyst in the above (1) is proposed in Japanese Patent Kokai (Laid-Open) No. 58-204188 (FIG. 2), No. 60-35472 (FIG. 1) and No. 55-113272. Furthermore, use of a carbon plate having rectangular grooves is shown in Japanese Patent Kokai (Laid-Open) Nos. 2-260371, 3-102774 and 2-86071.

When the corrugated current collector or carbon plate having rectangular grooves is brought into contact with the electrode, spaces are formed between the current collector or carbon plate and the electrode, and hydrogen or oxygen diffuses onto the surface of the electrode through these spaces. The above-mentioned construction is usually employed for fuel cells in which ion-exchange resins are used, and the output can be developed to some extent, but the above construction is merely for accelerating the diffusion of the gas onto the surface of the catalyst from the main stream of the fuel gas.

However, the diffusion of the gas also occurs in the electrode and the higher output will be able to be developed by carrying out the diffusion of the gas in the electrode efficiently. For efficient diffusion of the gas in the electrode, Japanese Patent Kokai (Laid-Open) No. 1-143151 proposes to increase the porosity of the electrode thereby to enhance the contact effect between the catalyst and the reaction gas and to increase the reaction rate.

The above conventional methods suffer from the following problems. The protons which have transferred through the ion-exchange membrane react with oxygen at a high rate at the interface between the ion-exchange membrane and the oxygen electrode. Therefore, water is produced at the oxygen electrode and a wafer film is formed at a high current density and results in a so-called flooding phenomenon. This water film causes reduction in the contact efficiency between the catalyst and the oxygen gas which has diffused through he electrode and the output density decreases. Thus, the cell performance becomes unstable. This phenomenon readily occurs at the interface between the oxygen electrode and the ion-exchange membrane, the efficiency of transferring protons from the ion-exchange membrane to the oxygen electrode also decreases to cause deterioration of the cell performance.

SUMMARY OF THE INVENTION

An object of the present invention is to provide a polymer electrolyte type hydrogen-oxygen fuel cell inhibited from flooding of water at the oxygen electrode.

The present invention provides a polymer electrolyte type hydrogen-oxygen fuel cell which comprises a polymer electrolyte membrane, an oxygen electrode and a hydrogen electrode which are a pair of gas-permeable electrodes between which said membrane is interposed, and electron conductors each provided on the side of the electrodes which is opposite to the side facing the electrolyte membrane. In this fuel cell, the oxygen electrode or cathode comprises a catalytically active component, a carrier therefor and a binder. The oxygen electrode has such a gradient in water repellency across the thickness thereof that the water repellency is highest in the area which faces the electrolyte membrane and lowest in the area which faces the conductor. Furthermore, the oxygen electrode can have such a gradient in concentration of the catalytically active component across the thickness thereof that the concentration is highest in the area which faces the electrolyte membrane and lowest in the area which faces the electron conductor. Moreover, the oxygen electrode can have such a gradient in porosity across the thickness thereof that the porosity in the area which faces the electrolyte membrane is equal to or larger than the porosity in the area which faces the electron conductor. Further, the oxygen electrode contains an ionic conductor comprising the same material as or a material different from that of the electrolyte membrane and the concentration of this ionic conductor in the oxygen electrode in the area which faces the electrolyte membrane can be equal to or higher than the concentration in the area which faces the electron conductor.

BRIEF DESCRIPTION OF DRAWINGS

FIG. 5 is a schematical, partial, cross-sectional view showing the construction of another cell according to the present invention, wherein the typical step distributions of the concentration of the water repellent, the concentration of the ionic conductor and the concentration of the catalytically active component and the porosity in the oxygen electrode are shown.

FIG. 6(1) is a schematical view showing the state of the water repellent, the catalytically active component and the carrier existing in the oxygen electrode of a low porosity.

FIG. 6(2) is a schematical view showing the state of the water repellent, the catalytically active component and the carrier existing in the oxygen electrode of a high porosity.

FIG. 7(2) is a schematical, partial, cross-sectional view showing the construction of a conventional cell.

DETAILED DESCRIPTION OF PREFERRED EMBODIMENTS

The present invention additionally provides the advantageous effects that the diffusion of the gas in the electrode can be carried out at a high efficiency, the redox reaction which takes place at the interface between the electrode and the ion-exchange membrane can be accelerated, and the ionic conductivity in the electrode can be improved.

The distributions of the concentrations of the ionic conductor and the catalytically active component, the distribution of porosity and, the distribution of water repellency may change continuously or discontinuously.

The ionic conductor used as a polymer electrolyte is preferably an ion-exchange membrane comprising a perfluorosulfonic acid resin or a perfluorocarboxylic acid resin.

The thickness of the membrane is preferably 30–300 μm. The catalytically active component includes, for example, platinum and platinum catalysts in which ruthenium, WC or MoC is dispersed (CO-poisoning resistant catalysts) and platinum is preferred.

The electrode can be provided with the gradient in water repellency by incorporating therein a water repellent, preferably polytetrafluoroethylene, fluorinated graphite or a mixture thereof and changing the amount of the water repellent.

The polymer electrolyte type oxygen-hydrogen fuel cells have the defect that since flooding of water occurs at the oxygen electrode, namely, cathode, the diffusion of oxygen is hindered and the cell performance is deteriorated. However, the flooding of water can be inhibited when the water repellency of the electrode is higher in the area adjacent to the electrolyte and lower in the area adjacent to the electron conductor. This is because since the water repellency at the interface between the ionic conductor and the electrode is strong, water which penetrates into the interface does not become a water film, but becomes droplets and thus, the catalytically active component is not covered with such a water film.

Figure 1:
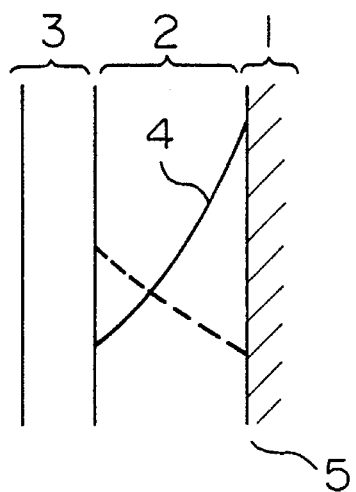
FIG. 1 is a schematical, partial, cross-sectional view showing the construction of the cell according to the present invention, wherein the distribution of concentration of the water repellent and the degree of hydrophilicity in the oxygen electrode are shown.

In FIG. 1, the degree of hydrophilicity in the electrode is shown by a dotted line. The area which faces the electron conductor 3 is relatively readily wetted and the interface 5 between the electrolyte (ionic conductor) 1 and the electrode is relatively hardly wetted. Therefore, water produced at the interface 5 moves from the hydrophobic area which faces the interface 5 to the hydrophilic area which faces the electron conductor 3 and is removed out of the system by evaporation or the like. In this case, the concentration of water is higher at the interface 5 and is lower in the area which faces the electron conductor. This concentration gradient results in increase of a diffusion speed of water towards the electron conductor 3. Thus, it is possible to remove water at a high efficiency and the flooding of water at the interface 5 can be further effectively inhibited.

Figure 2:
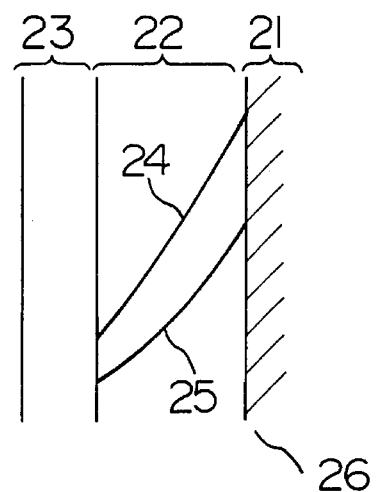
FIG. 2 is a schematical, partial, cross-sectional view showing the construction of the cell according to the present invention, wherein the distribution of concentration of the water repellent and the concentration of the catalytically active component in the oxygen electrode are shown.

The electrode shown in FIG. 2 is prepared so that the catalyst component is contained in the higher concentration in the area which faces the electrolyte 21, whereby the electrode reaction more easily proceeds at the interface 26 between the electrode and the electrolyte 21, thus the cell performance is improved. This is for the following reasons. That is, the protons transferred from the electrolyte 21 are released at the interface 26 from the electrolyte 21 and accept electrons from oxygen to produce water. Alternatively, the protons transfer to the electrolyte contained in the electrode 22 and then follow the same course as above. Therefore, the proton concentration is highest at the interface 26 and gradually decreases in the direction towards the electron conductor 23. Since the reaction rate is proportional to the proton concentration, it is highest at the interface 26.

Since the electrode reaction takes place on the catalyst, the reaction rate increases with an increase in the amount of the catalyst as a reaction site. For this reason, in the case of the electrode having the distribution of the catalyst component as shown in FIG. 2, the reduction rate of oxygen at the interface 26 is markedly higher than that of conventional electrodes and the cell performance can be improved. Furthermore, as shown in FIG. 2, the concentration of the water repellent is high at the interface 26 and since the water repellent has the effect to cover the catalyst component, it reduces the reaction rate. In the electrode shown in FIG. 2, the concentration of the catalyst component is high at the interface 26 and the surface area of the catalyst is large.

Therefore, even if the catalyst is covered with the water repellent to some extent, the surface area of the catalyst is sufficient to allow the reaction to proceed.

Figure 3:
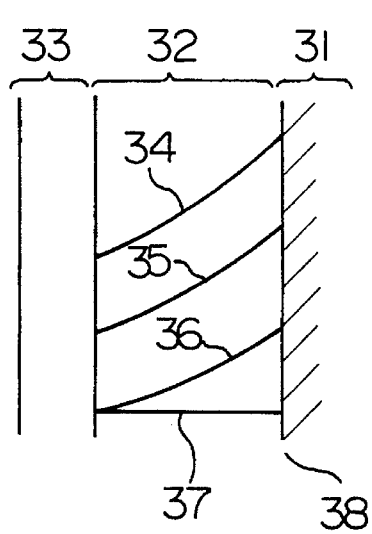
FIG. 3 is a schematical, partial, cross-sectional view showing the construction of the cell according to the present invention, wherein the distributions of concentration of the water repellent and the concentration of the catalytically active component and the distribution of porosity in the oxygen electrode are shown.

In the electrode shown in FIG. 3, the porosity in the electrode 32 has the distribution as shown by curve 36 or 37. It is important that the porosity of the electrode 32 has the distribution which does not decrease in the area which faces the electrolyte 31 at interface 38. In all of the electrodes shown in FIG. 1 to FIG. 3, the concentration of the water repellent is high in the area which faces the electrolyte 1, 21 or 31. The water repellent is effective for rendering the electrode hydrophobic, but covers the surface of the catalyst component, namely, the reaction site, to hinder the progress of the catalytic reaction when the concentration of the water repellent is high.

For solving the above defect, there is a method of increasing the concentration of the catalyst as shown in FIG. 2 to increase the surface area of the catalyst. Another method is to increase the porosity as shown in FIG. 3, thereby to reduce the surface area of the catalyst covered with the water repellent. This is shown in FIG. 6. FIG. 6(1) shows the structure in the vicinity of the catalyst in the electrode when the porosity is low. In FIG. 6(1), catalyst 61 is supported on catalyst carrier 62 and since the concentration of the water repellent is high, the catalyst is covered with the water repellent 63. The catalyst 64 positioned with being surrounded by the carriers 62 and enclosed by a dotted line in FIG. 6(1) is not directly covered with the water repellent, but the diffusion of the gas through pore 65 is difficult to occur and consequently the inner catalyst 64 in the structure of FIG. 6(1) is inactive. FIG. 6(2) shows the structure of FIG. 6(1) where the porosity of the electrode is increased. The new pore 69 is present and so the catalyst 70 enclosed with a dotted line is not covered with water repellent 66 and is exposed to the pore. Accordingly, gas 68 is easily brought into contact with the catalyst 70 and the active site can be effectively utilized. In this way, the catalyst can be effectively utilized by increasing the porosity and further, the diffusion of the gas is accelerated and the contact efficiency between the surface of the catalyst and the gas is improved. Especially, the catalytic reaction proceeds most easily at the interface between electrode 32 and electrolyte 31 as shown in FIG. 3. Therefore, when the porosity in the interface area is high, the reaction rate can be increased and, as a result, the cell performance can be improved.

Figure 4:
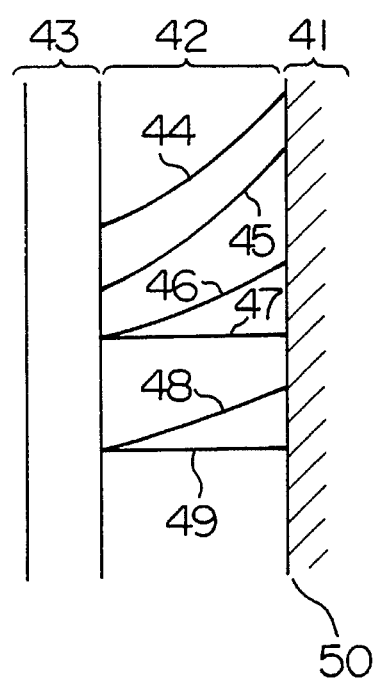
FIG. 4 is a schematical, partial, cross-sectional view showing the constriction of the cell according to the present invention, wherein the distributions of concentration of the water repellent, the concentration of the ionic conductor and the concentration of the catalytically active component and the distribution of porosity in the oxygen electrode are shown.

In the electrode shown in FIG. 4, the electrolyte has the distributions as shown with curves 48 and 49. It is important here that the concentration of the electrolyte has such a distribution as not to decrease in the area adjacent to the interface 50. The protons released from electrolyte 41 transfer to the electrolyte dispersed in the electrode and are brought into contact with oxygen in the vapor phase through the dispersed electrolyte to allow the reaction to proceed. Since the surface area of the electrolyte dispersed in the electrode is large, the contact area between the protons and oxygen is also large. Thus, dispersing the electrolyte in the electrode accelerates the progress of the reaction.

However, in the case of the electrode where the concentration of the electrolyte in the electrode decreases at the interface 50 in FIG. 4, the surface area of the electrolyte dispersed in the electrode decreases at the interface 50 where the reaction takes place most vigorously and the contact area between oxygen and protons is small and thus, the progress of the reaction is hindered. Accordingly, as mentioned above, it is necessary that the concentration of the electrolyte dispersed in the electrode has such a distribution as not to decrease in the area adjacent to the interface 50.

The electrode 56 in FIG. 5 comprises three layers where the distribution of concentration of the water repellent changes stepwise. In the electrode shown in FIG. 5, the concentration of the water repellent is high in the area adjacent to the electrolyte 51. As mentioned above, the polymer electrolyte type oxygen-hydrogen fuel cells suffer from the problem that the flooding of water which occurs at the oxygen electrode hinders the diffusion of oxygen and deteriorates the cell performance. However, in the electrode shown in FIG. 5, since the concentration of the water repellent is high at the interface 57 between electrolyte 51 and electrode 56, the flooding of water can be inhibited, This is because the concentration of the water repellent is high at the interface 57 and the degree of hydrophilicity is high at the interface and so even when water penetrates into the interface, this does not become a water film, but becomes droplets and the catalyst component is inhibited from being covered with the water film. The degree of hydrophilicity is such that at the interface between the electron conductor 55 and the electrode is relatively high in wettability with water and the interface 57 is relatively low in wettability with water. Therefore, the water produced at the interface 57 to the hydrophilic area adjacent to the electron conductor 55 and is removed by evaporation or the like. In this case, the concentration of water is high at the interface 57 and is low in the area adjacent to the electron conductor 55. Due to this concentration gradient, the diffusion rate of water to the area adjacent to the electron conductor 55 increases and it becomes possible to remove water at a high efficiency. Thus, flooding of water at the interface 57 can be further efficiently inhibited.

The basic cell structure of the present invention is shown in FIG. 1. The cell has a pair of electrodes 2 between which electrolyte 1 is interposed and electron conductors 3 provided outside the electrodes. FIG. 1 shows only a part of the electrolyte and the electrode and the electron conductor provided on one side of the electrolyte. The electrode 2 comprises a catalytically active component, a water repellent component, an electrolyte which is the same as or different from the electrolyte 1 and a catalyst carrier. Distribution 4 of the concentration of the water repellent is shown in FIG. 1. The electrode is prepared so that the concentration of the water repellent is higher in the area adjacent to the ion-exchange membrane (electrolyte) 1.

The cell of the present invention shown in FIG. 2 is composed of electrolyte 21, electrodes 22 and electron conductors 23. The electrode 22 comprises a catalyst component, a water repellent component, an electrolyte which is the same as or different from the electrolyte 21 and a catalyst carrier. Concentration distribution 24 of the water repellent and concentration distribution 25 of the catalytically active component are shown in FIG. 2. The electrode is prepared so that both the concentrations are higher in the area adjacent to the electrolyte 21.

The cell shown in FIG. 3 is composed of electrolyte 31, electrodes 32 and electron conductors 33. The electrode 32 comprises a catalytically active component, a water repellent component, an electrolyte which is the same as or different from the electrolyte 31 and a catalyst carrier. The concentration distribution 34 of the water repellent, the concentration distribution 35 of the catalytically active component and the porosity distributions 36 and 37 are shown in FIG. 3. The electrode is prepared so that these concentrations and porosity are higher in the area adjacent to the electrolyte 31. With reference to the porosity distributions 36 and 37, either of them must be chosen, but it is important that the porosity must not be lower in the area adjacent to the electrolyte 31.

The cell shown in FIG. 4 is composed of electrolyte 41, electrodes 42 and electron conductors 43. The electrode 42 comprises a catalytically active component, a water repellent component, an electrolyte which is the same as or different from the electrolyte 41 and a catalyst carrier. The concentration distribution 44 of the water repellent, the concentration distribution 45 of the catalytically active component, the concentration distributions 48 and 49 of the electrolyte and the porosity distributions 46 and 47 are shown in FIG. 4. The concentration distributions 48 and 49 of the electrolyte are the same as or different from the distribution of the electrolyte 41 and one of the distributions 48 and 49 must be chosen. Important is that such a concentration distribution of the electrolyte as decreasing in the area adjacent to the electrolyte 41 must not be given.

FIG. 5 shows the electrode structure in which the concentration distribution is discontinuous. The cell is composed of electrolyte 51, electrodes 52, 53 and 54 and electron conductor 55. The electrode consists of the three layers 52, 53 and 54. The concentration distribution 58 of the water repellent, the catalytically active component and the electrolyte contained in each of the layers changes stepwise as shown in FIG. 5. The porosity of the electrode can also be changed stepwise as shown in FIG. 5. In FIG. 5 the concentration distribution of only one kind is shown, but each of the concentrations of the water repellent, the catalytically active component and the electrolyte and the porosity may be changed stepwise. Furthermore, the catalyst shown in FIG. 5 consists of three layers, but the number of the layers is unlimited. Moreover, the electron conductor referred to hereinabove includes current collectors, diffusion layers or the like which are high in so-called electron conductivity.

A method for preparing the electrode having the concentration distributions as shown in FIGS. 1-5 is explained below. First, a method for forming the continuous concentration distributions as shown in FIGS. 1-4 is explained. A coating method is suitable for preparation of the concentration distribution of the water repellent. This method comprises coating a dispersion of the water repellent by brushing or the like on the surface of the catalyst previously formed as a thin film on the electron conductor and then allowing the resulting electrode to adhere to the ionic conductor. For example, a dilute solution prepared by dispersing PTFE in water is coated on the surface of a catalyst layer coated on an electron conductor such as a carbon paper. In this way, the concentration distribution 4 of the water repellent as shown in FIG. 1 can be obtained.

The coating method is also suitable for the preparation of the ionic conductor. This method comprises coating a dispersion of the ionic conductor by brushing or the like on the surface of the catalyst previously formed as a thin film on the electron conductor. For example, a dispersion prepared by dispersing an ion-exchange resin such as Nafion 117 (perfluorosulfonic acid resin membrane) in isopropyl alcohol is coated on the surface of a catalyst layer coated on an electron conductor such as a carbon paper. In this way, the concentration distributions 48 and 49 of the electrolyte as shown in FIG. 4 can be obtained.

The catalyst component can be prepared preferably by forming on the electron conductor a catalyst layer as a thin film on which a noble metal has been previously supported and adding thereto a fresh noble metal component through the surface. This method includes deposition from vapor phase such as vapor deposition, ion implantation or the like.

The pores can be prepared, for example, by bringing water vapor into contact with the surface of the catalyst previously formed as a thin film on an electron conductor. When water vapor penetrates into the catalyst layer, pores are formed in the catalyst. Therefore, pores of various sizes and distributions can be prepared by adjusting the flow rate of the water vapor and the concentration of the carrier gas.

Next, preparation of the concentration distribution as shown in FIG. 5 is explained. The catalyst layers 52–54 shown in FIG. 5 are prepared with various concentrations of the catalyst, carrier, water repellent and ionic conductor and are made into slurries. Then, first the catalyst layer 54 is coated on the electron conductor 55. Additionally, the catalyst layer 53 and the catalyst layer 52 are coated in succession and thereafter ionic conductor 51 is allowed to adhere to the layer 52. Thus, the construction of FIG. 5 can be formed. By this method, the concentration distribution of the catalyst, water repellent and ionic conductor can be formed stepwise as shown in FIG. 5. The distribution of porosity is prepared in the following manner. One method is to vary the amount of water or organic solvent contained in preparation of the catalyst layers 52–54. When the coated catalyst layers are dried, pores are formed at the time of evaporation of the water or organic solvent and the size and distribution of pores can be freely controlled by controlling the amount of the water or organic solvent and drying rate. Another method is to bring water vapor into contact with the surface of the catalyst layer 54 coated on the electron conductor 55 thereby to vary the porosity. After drying, the second catalyst layer 53 is coated on the catalyst layer 54 and subjected to the same treatment as above. In this way, the distribution of the porosity in the catalyst layers can also be changed.

Figure 10:
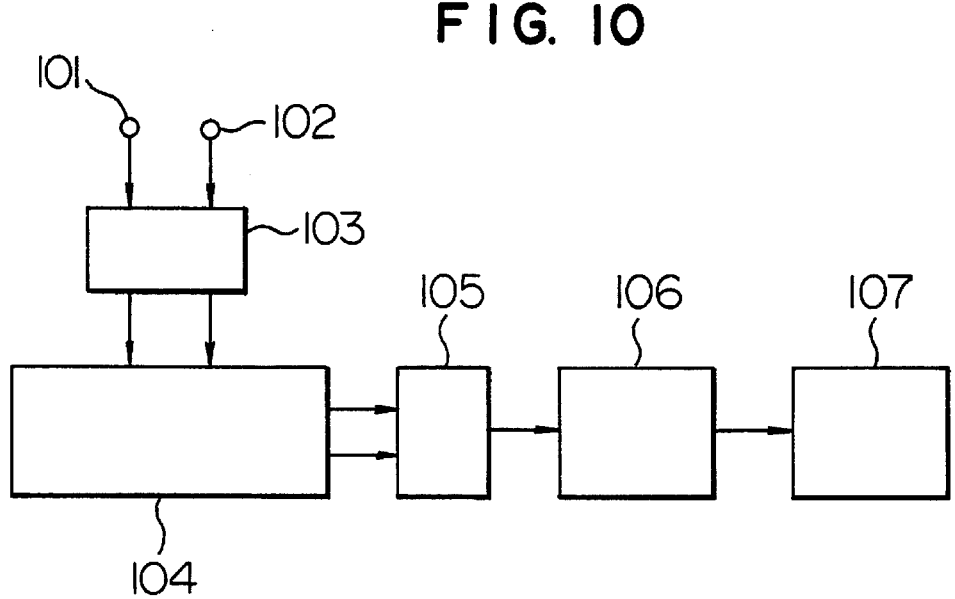
FIG. 10 is a diagram showing one embodiment of a power system in which the fuel cell according to the present invention is used.

A system to which the above-mentioned fuel cell is applied is explained below. FIG. 10 shows a power system. Hydrogen gas 102 and oxygen gas 101 are regulated by regulator 103 and then are fed to fuel cell 104 to generate electricity. The output from the fuel cell 104 is converted to alternating current by inverter 105 and then is supplied to power system 106 such as a motor to operate driving system 107. The hydrogen gas 102 may be produced by the decomposition of methanol.

Figure 11:
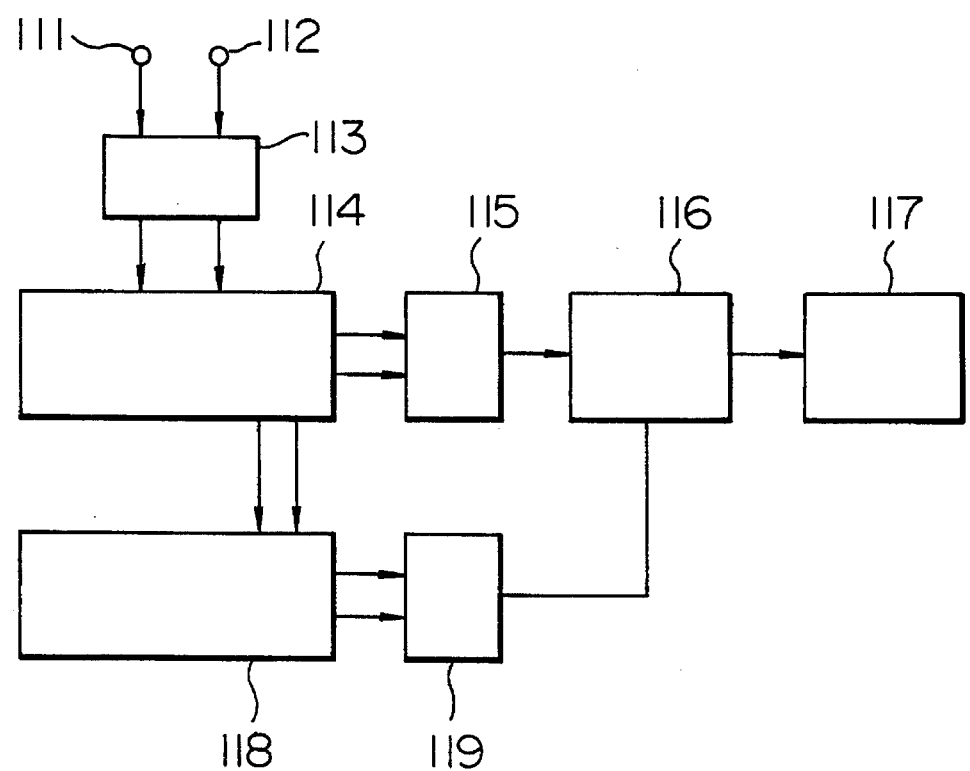
FIG. 11 is a diagram showing another embodiment of a power system in which the fuel cell according to the present invention is used.
Figure 12:
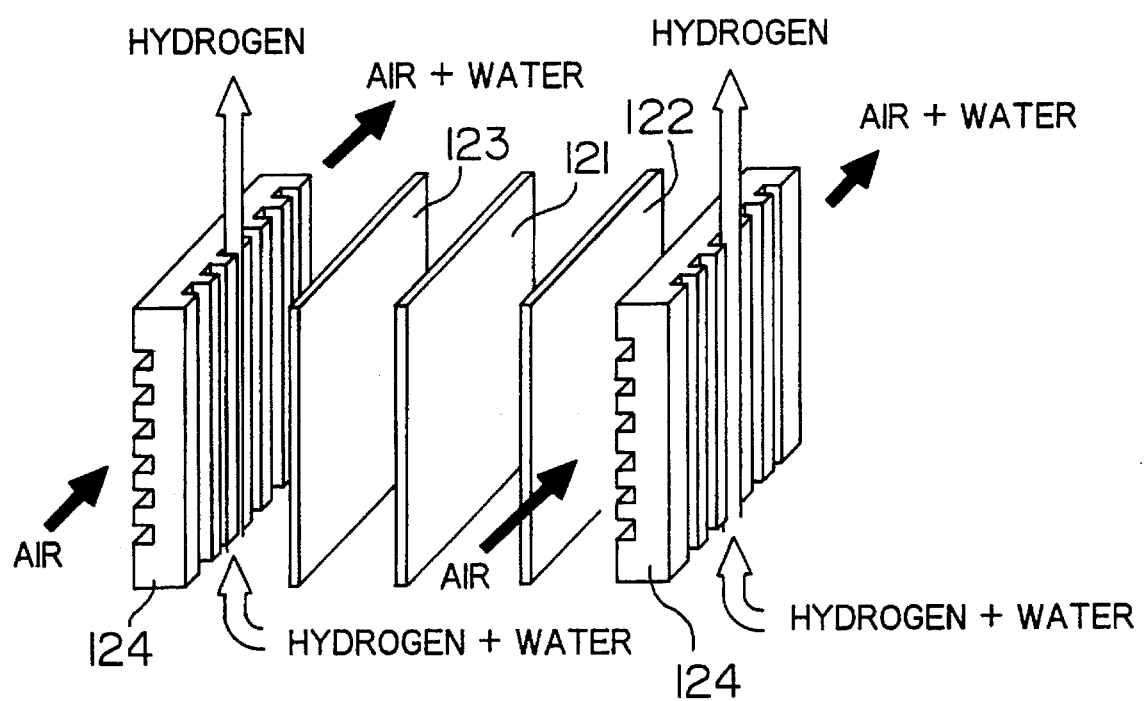
FIG. 12 shows a standard construction of a fuel cell in which 121 indicates an electrolyte (a solid polymeric membrane), 122 an oxygen electrode (+), 123 a hydrogen electrode (−) and 124 a current collector.

FIG. 11 shows another power system. Hydrogen gas 112 and oxygen gas 111 are regulated by regulator 113 and then are fed to fuel cell 114 to generate electricity. The output from the fuel cell 114 is converted to alternating current by inverter 115 and then is supplied to power system 116 such as a motor to operate driving system 117. The hydrogen gas 112 may be produced by the decomposition of methanol. The output from the fuel cell can be charged in secondary cell 118 and the output from the secondary cell 118 can be supplied to a power system through inverter 119.

According to this system, the output from one or both of the fuel cell 114 and the secondary cell 118 can be supplied to the power system.

The systems of FIG. 10 and FIG. 11 may be mounted on electric automobiles.

EXAMPLE 1

Figure 7:
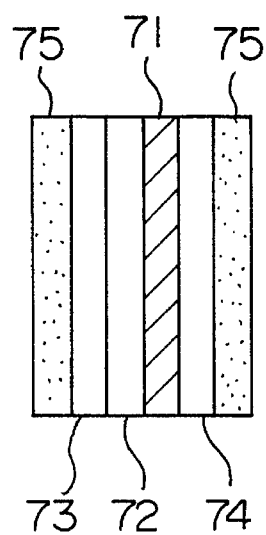
FIG. 7(1) is a schematical, partial, cross-sectional view showing the construction of the cell according to the present invention, wherein the oxygen electrode has a two-layer structure.
Figure 7:
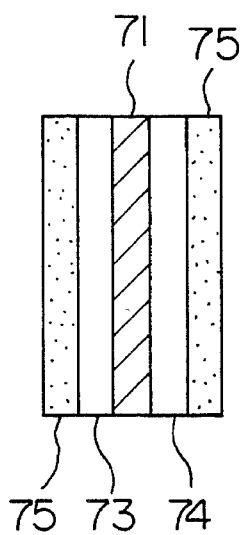

The constructions of the cells used in this Example are shown in FIG. 7(1) and FIG. 7(2). FIG. 7(1) shows the cell consisting of electrolyte membrane 71, hydrogen electrode 74, oxygen electrode 73 and diffusion layers 75. Nafion 117 (perfluorosulfonic acid resin membrane) manufactured by DuPont de Nemours, E. I. & Co. was used as the electrolyte membrane. A carbon paper having pores of about 100 μm in diameter and having a thickness of 100 μm was used as the diffusion layer. The compositions of the electrodes and 74 are shown in Table 1.

TABLE 1

| | Electrode | | | Unit: mg/cm² |
|---|---|---|---|---|
| Item | 73 | 72 | 74 | |
| PTFE | 0.46 | 0.85 | 1.5 | |
| Nafion 117 | 0.51 | 0.51 | 1.0 | |
| Platinum | 3.22 | 3.22 | 3.0 | |
| Porosity ε (Vol %) | 40 | 40 | 40 | |

FIG. 7(1) shows an electrode consisting of electrolyte membrane 71, hydrogen electrode 74 and oxygen electrode comprising 72 and 73. The compositions of the oxygen electrodes 72 and 73 and the hydrogen electrode 74 are shown in Table 1. The construction shown in FIG. 7(1) is called "cell A" hereinafter. The feature of the cell A is that the oxygen electrode is composed of two layers and the concentration of PTFE as a water repellent in the electrode layer 72 contiguous to the electrolyte membrane 71 is higher than in the outer electrode layer 73.

A method for making the electrode is shown below. First, an electrode slurry having the composition as shown in Table 1 was uniformly coated on the above-mentioned carbon paper of 150 cm². Thereafter, the carbon paper was cut to make an electrode of 30 mm×30 mm.

Oxygen electrodes 72 and 73 of the cell A were made in the following manner. That is, first the slurry of the electrode layer 73 was coated on the carbon paper as mentioned above and then the slurry of the electrode layer 72 was coated thereon. A conventional cell B is shown in FIG. 7(2).

Figure 9:
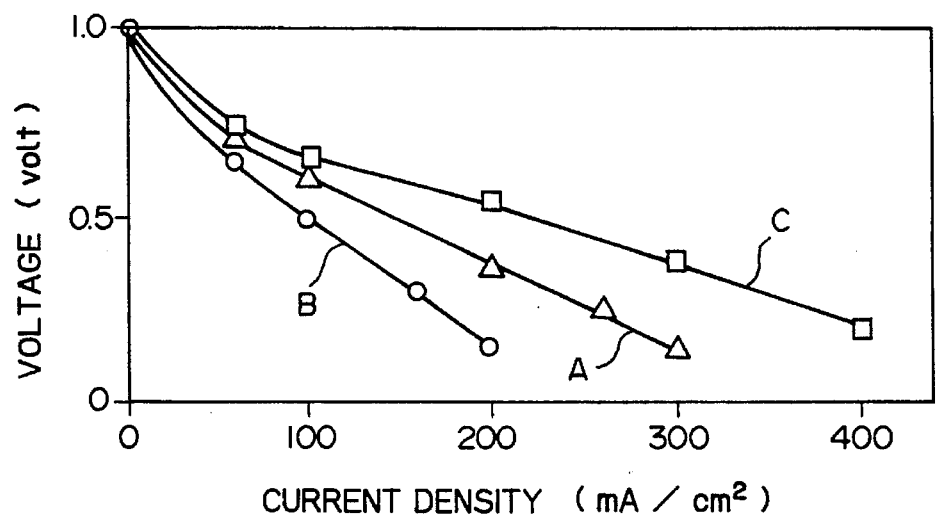
FIG. 9 is a graph showing the current-voltage characteristics of the cells shown in FIG. 7(1), FIG. 7(2) and FIG. 8.

Bonding of the electrode obtained above to Nafion was carried out by hot pressing method. The structures of cells A and B were pressed at 120° C. under 100 kg/cm² for 15 minutes, respectively. The resulting cells A and B were evaluated on current-voltage characteristics and the results are shown in FIG. 9. The critical current density of the conventional cell B was 200 mA/cm² while that of the cell A of the present invention exceeded 300 mA/cm². In this way, when the oxygen electrode consists of two layers and the concentration of the water repellent in the electrode adjacent to the electrolyte is higher, the cell performance can be markedly improved.

EXAMPLE 2

Figure 8:
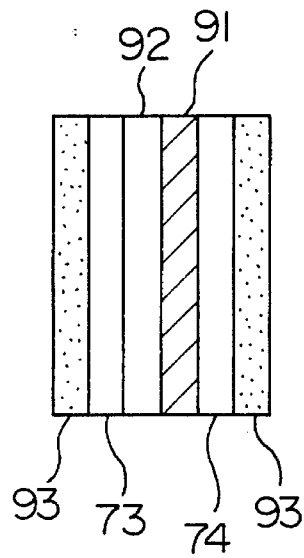
FIG. 8 is a schematical, partial, cross-sectional view showing the construction of the cell according to the present invention.

FIG. 8 shows cell C used in this example. The cell was composed of Nafion membrane 91, hydrogen electrode 74, oxygen electrodes 92 and 73 and diffusion layers 93. Compositions of the electrodes 92, 73 and 74 are shown in Table 2.

TABLE 2

| | Electrode | | | Unit: mg/cm² |
|---|---|---|---|---|
| Item | 73 | 92 | 74 | |
| PTFE | 0.46 | 0.85 | 1.5 | |
| Nafion 117 | 0.51 | 0.51 | 1.0 | |
| Platinum | 3.22 | 3.22 | 3.0 | |
| Porosity ε (Vol %) | 50 | 50 | 50 | |

The features of this cell are as follows. The oxygen electrode consisted of two layers and porosity of the electrode 73 adjacent to the diffusion layer was 40% while that of the electrode 92 adjacent to the Nafion membrane was 50%.

The porosity was adjusted in the following manner. An amount of 3.86 g of a 50 wt % platinum-supporting carbon, 0.27 g of a 60% dispersion of PTFE, 0.31 g of a 5% solution of Nafion in isopropyl alcohol and 4 cc of pure water were mixed by an attrition mill. The resulting mixture was coated on the above-mentioned carbon paper and dried at 80° C. for 5 hours to form the electrode 73 as shown in FIG. 8. Then, this electrode 73 was overcoated with a mixture prepared by mixing 3.86 g of a 50 wt % platinum-supporting carbon, 0.27 g of a 60% dispersion of PTFE, 0.31 g of 5% solution of Nafion in isopropyl alcohol and 8 cc of pure water by an attrition mill. This was the electrode 92 in FIG. 8. Since the electrode 92 was prepared by using pure water in an amount larger than in the electrode 73, when water was evaporated in drying to form pores, the porosity of the electrode 92 was higher.

FIG. 9 shows voltage-current characteristics of the cell C. The cell C in which the porosity of the oxygen electrode was 50% had a critical current density of more than 400 mA/cm² and was further improved in the cell performance as compared with the cell A in which the electrode had a porosity of 40%.

What is claimed is:

1. A polymer electrolyte, hydrogen-oxygen fuel cell comprising an oxygen electrode having a thickness and a hydrogen electrode which are a pair of gas-permeable electrodes, a polymer electrolyte membrane provided between said oxygen electrode and said hydrogen electrode and electron conductors provided respectively on an opposite side of said electrodes from the electrolyte membrane side, wherein said oxygen electrode comprises a catalytically active component, a carrier for the catalytically active component, and a binder, said oxygen electrode having such a gradient in water repellency across the thickness of the electrode that the water repellency is highest in the area adjacent to the electrolyte membrane and lowest in the area adjacent to the conductor and having such a gradient in the concentration of the catalytically active component across the thickness of the oxygen electrode that the concentration is highest in the area adjacent to the electrolyte membrane and is lowest in the area adjacent to the respective electron conductor.

2. A fuel cell according to claim 1, wherein the oxygen electrode has such a gradient in porosity across the thickness of the electrode that the porosity in the area adjacent to the electrolyte membrane is equal to or higher than the porosity in the area adjacent to the electron conductor.

3. A fuel cell according to claim 1, wherein the oxygen electrode contains an ionic conductor comprising the material which is the same as or different from that of the electrolyte membrane and the concentration of the ionic conductor in the area adjacent to the electrolyte membrane is equal to or higher than the concentration in the area adjacent to the electron conductor.

4. A fuel cell according to claim 3, wherein the ionic conductor is an ion-exchange membrane comprising a perfluorosulfonic acid resin or a perfluorocarboxylic acid resin and the ion is proton.

5. A fuel cell according to claim 1, wherein the catalyst active component is at least one metal selected from the group consisting of metals belonging to platinum group and metals belonging to Group VI of the periodic table.

6. A fuel cell according to claim 1, wherein the binder is a water repellent comprising polytetrafluoroethylene, fluorinated graphite or a mixture thereof and is contained in the oxygen electrode in an amount which changes across the thickness of the oxygen electrode, thereby to give a gradient in water repellency to the electrode.

7. A power system having the fuel cell according claim 1 as an output source.

8. An electric automobile having the fuel cell according to claim 1 as an output source.

9. A secondary cell having the fuel cell according claim 1 as a charging source.

10. A fuel cell according to claim 1, wherein the polymer electrolyte membrane is an ion-exchange membrane comprising a perfluorosulfonic acid resin or a perfluorocarboxylic acid resin.

* * * * *